Aug. 20, 1968  R. B. RODEN  3,397,754
AMBIENT SEISMIC NOISE ELIMINATION USING HORIZONTAL
COMPONENT ENERGY
Filed Dec. 23, 1966  2 Sheets-Sheet 2

INVENTOR
ROBERT B. RODEN
ATTORNEY 3,397,754
Patented Aug. 20, 1968

3,397,754
AMBIENT SEISMIC NOISE ELIMINATION USING HORIZONTAL COMPONENT ENERGY
Robert B. Roden, Irving, Tex., assignor to Texas Instruments Incorporated, Dallas, Tex., a corporation of Delaware
Filed Dec. 23, 1966, Ser. No. 604,418
8 Claims. (Cl. 181—.5)

ABSTRACT OF THE DISCLOSURE

Signals from horizontal component seismometers are filtered in dependence upon the coupling between horizontal and vertical components of ambient seismic noise and then mixed with the output signal from a vertical seismometer to enhance the vertically incident P-waves while preserving the form of the P-wave signal.

Field of the invention

This invention relates to seismic exploration and, more particularly, to the use of horizontal and vertical component seismometers for attenuation of surface wave noise. In a more specific aspect, the invention relates to detection of seismic waves by horizontal component seismometers at points spaced in predetermined relation to a vertical component seismometer, filtering the summation signal from horizontal component seismometers in accordance with the coupling between horizontal and vertical components of ambient noise and combining the filtered signal with the output signal from a vertical component seismometer.

Prior art

A common problem to both exploration and earthquake explosion seismology is the enhancement of signals consisting of P-waves with near vertical incidence relative to a background of Rayleigh-wave noise. Such noise generally involves a complete set of elliptically-polarized surface-wave modes. A vertically incident P-wave produces only vertical component of motion whereas a Rayleigh wave is characterized by both horizontal and vertical components.

Signal enhancement systems and methods heretofore have been employed wherein arrays of vertical-component seismometers differentiate between wave types on the basis of apparent velocity. Such operations are described by Backus et al., Geophysics 1964, Vol. 29, pp. 672–692, and Burg, Geophysics 1964, Vol. 29, pp. 693–713. The use of three-component detectors for signal enhancement has been disclosed by Shimshoni et al., Geophysics 1964, Vol. 29, pp. 664–671. The simplest mode of operation involving three orthogonally oriented seismometers at a given point has been described by Claerbout, Geophysics 1964, Vol. 29, pp. 197–211. Furthermore, the use of orthogonally described seismometers for sensing the direction of sound wave propagation is described in U.S. Patent 2,982,942 to J. E. White.

In none of the foregoing disclosures is there utilization on exploitation of the coupling between horizontal or vertical components of ambient seismic noise.

Summary of the invention

In accordance with the present invention, a vertical component seismometer is positioned at a detecting station together with a plurality of horizontal component seismometers oriented in an array in the region of the vertical component seismometer with instantaneous directional sensitivities extending away from the vertical component seismometer. Means are provided for summing the output signals from the horizontal array and for filtering the summation signal in dependence upon the coupling between horizontal and vertical components of the ambient noise detected by the vertical and horizontal seismometers. Following the filter, means are provided for generating the summation signal from the filtered output signal from the horizontal component seismometers and the output signal from the vertical seismometer to provide a summation signal in which the vertically-incident P-waves are substantially enhanced without modifying the form of the P-wave signal.

Description of the drawings

For a more complete understanding of the present invention and for further objects and advantages thereof, reference may now be had to the following description taken in conjunction with the accompanying drawings in which.

Description of the preferred embodiments

In seismic exploration, isotropic noise waves travel in all directions with equal probability. In such a case, a simple three-component system offers no signal-enhancement capability. However, an array of vertical seismometers heretofore has been found to be useful.

The present invention, in contrast to the foregoing, is directed to the use of certain multi-component arrays which involve vertical and horizontal component detectors which do offer advantages over vertical component arrays even when the noise is isotropic.

Figure 1:
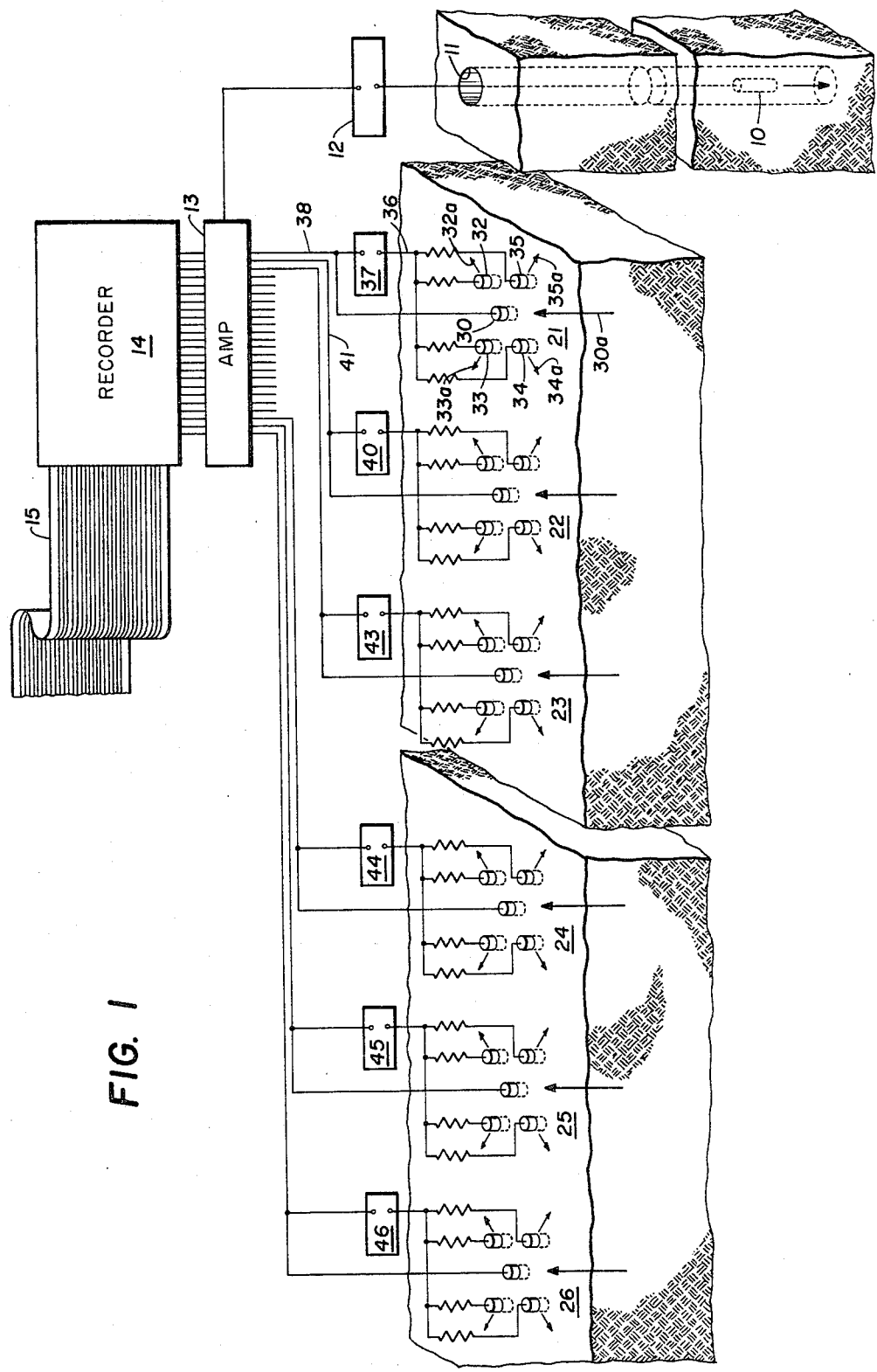
FIGURE 1 illustrates an embodiment of the invention.

An embodiment of the present invention is illustrated in FIGURE 1 wherein seismic waves are generated by detonation of an explosive-charge 10 located in a shot hole 11. A suitable detonating device 12 is coupled to the charge 10 and to an amplifier unit 13 to apply a time break signal to recorder 14 along with signals from a plurality of detectors. The amplifier unit 13 is a multichannel bank of amplifiers wherein one channel is provided for each of the signals to be recorded on a multitrace seismogram 15. As is conventional, the time break signal corresponding with the instant detonation of the charge 10 is recorded as a pulse on one of the traces on record 15 following which the energy reflected from subsurface reflecting horizons also appears combined with and often masked by noise waves that cannot otherwise be eliminated.

As illustrated in FIGURE 1, a plurality of seismometer arrays 21–26 are employed for detecting the seismic energy. The arrays 21–26 are spaced at progressively increasing distances from the shot hole 11 along a seismic spread or traverse. Preferably, the intervals between the adjacent seismometer arrays are uniform. While only six such arrays have been shown, it is to be understood that twenty-four detector stations, more or less, are conventionally employed.

Each of the arrays 21–26 includes a plurality of seismometers. In the array 21, for example, the detector 30 is a vertical component seismometer. In contrast, four seismometers 32–35 are horizontal component seismometers. The vertical component seismometer 30 is sensitive to motion and direction of arrow 30a. The instantaneous polarities of the horizontal component seismometers 32–35 are represented by the arrows 32a–35a. More particularly, they are so connected as to produce instantaneous voltages which will have polarities generally corresponding with directions of arrows 32a–35a. Thus, for a motion in the direction of arrow 32a, a positive voltage output would be produced, whereas motion in the same direction at seismometer 34 would produce a negative voltage. Such motion at seismometers 33 and 35 theoretically would produce zero output.

The signals from the horizontal seismometers 32–35 are applied by way of a summing network to a filter 37. The output of filter 37 is then combined on channel 38 with the output from the vertical component seismometer, and the resultant signal is then amplified in amplifier unit 13 and recorded on record 15 as trace 1, for example.

In a similar manner, the signals from the horizontal component seismometers in array 22 are summed and applied to a filter 40 and combined with the signal from a vertical component seismometer on channel 41 for production of trace 2 on record 15. Filters 43–46 similarly cooperate with the seismometers in arrays 23–26 to perform additional traces on record 15.

The filters 37, 40, 43, and 46 are filters of the interpolation error type.

The parameters of the filters are exact and fixed for any given pair of signals such as the two signals applied to channel 38. However, the parameters cannot be specified or described except in terms of the signals upon which the filters are to operate. In each case, the filter will be a time domain filter of the nature described in U.S. Patent 3,284,763 to Burg et al., but will differ therefrom in that in the present case the filter is based upon and is applied to the summation signal from horizontal seismometers 32–35 and the filtered output is then combined with the signal from the vertical seismometer 30. In the present case, the correlation functions are obtained for the total time interval or gate of the trace to which the filter is to be applied.

Figure 2:
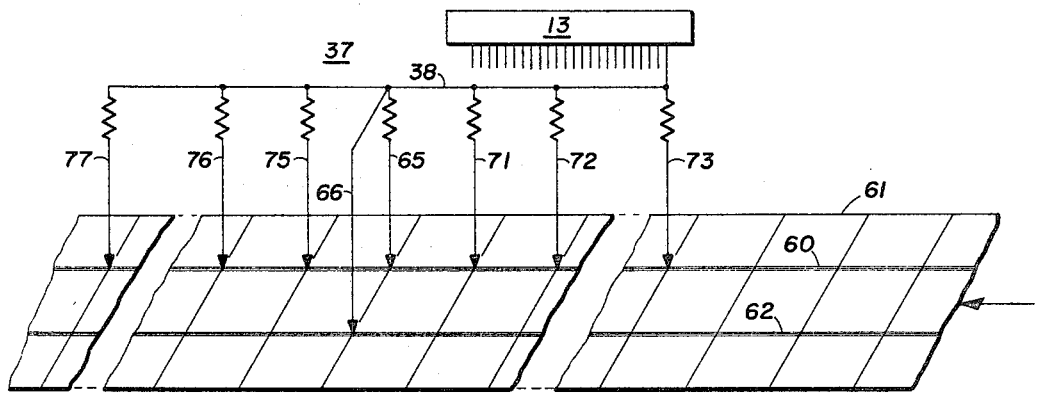
FIGURE 2 illustrates one form of the filters of FIGURE 1.

Referring now to FIGURE 2, a filter 37 has been illustrated wherein the signal from channel 36 is recorded in reproducible form on a first track 60 on a magnetic tape 61. The signal from seismometer 30 is recorded on track 62. Filter 37 is a time domain filter which employs time-spaced samples of the signal on track 60 as by way of a plurality of channels. A center channel 65 picks up a time sample of the signal on track 60 at the same time as a sample picked up on channel 66 from track 62. Channels 71, 72, . . . 73 pick up samples of the signal on track 60 ahead of the signal on channel 65. Channels 75, 76, . . . 77 pick up samples of the signal on track 60 which trail the sample on channel 65. The signals on channels 65–77 are all weighted or attenuated in accordance with fixed relationships which depend upon the nature of the signals on tracks 60 and 62. More particularly, the weights (the sizes of the resistors) in the channels 65, 71–77 are the weights specified in Equation 1.

For any given pair of seismic signals on tracks 60 and 62, the values of the weighting elements and the spacing therebetween become fixed and unchanged and is specific in terms of structure. Equation 1 defines the relationship existing by reason of coupling between horizontal and vertical components of ambient seismic noise. The signals from the track 60 thus suitably weighted are then combined on the bus 38 with the signal from channel 66 so that the signal on channel 66 will be enhanced in its definition of vertically arriving energy. The signal on bus 38 is then applied to an amplifier in an amplifier bank 13.

Figure 4:
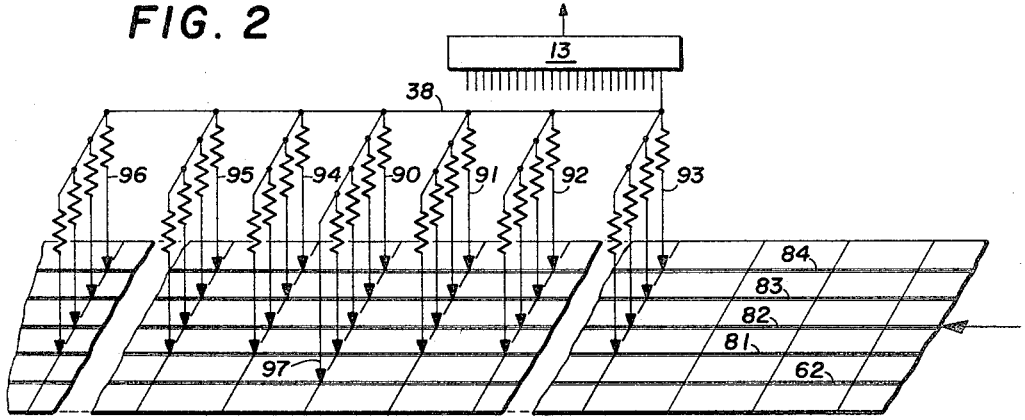
FIGURE 4 illustrates another form of the filters of FIGURE 1.
Figure 3:
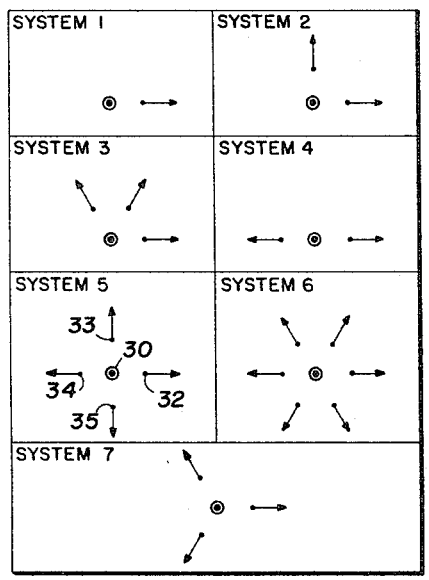
FIGURE 3 illustrates various geophone patterns in accordance with the present invention.

In FIGURE 4, seven different systems or seismometer arrays have been illustrated. The array of FIGURE 1 corresponds with system 5 where in the vertical seismometer 30 is at the center of a symmetrical array which includes seismometers 32–35. It will be noted that systems 1, 2, and 3 are not symmetrical whereas systems 4–7 are symmetrical. Where the systems are symmetrical, the signals from the horizontal component seismometers may be summed as on channel 36 of FIGURE 1, so that a single time domain filter may be employed such as filter 37, FIGURE 2, for the summation signal from all of the horizontal component seismometers. However, where the system is not symmetrical, as in systems 1–3, then a separate time delay filter will be employed for each signal from each of the horizontal seismometers. The outputs of the filter are then summed along with the signal from the vertical component seismometer. For example, in FIGURE 4, a multi-filter system has been illustrated wherein track 62 again has recorded thereon the signal from vertical seismometer 30. Tracks 81–84 have signals thereon from seismometers 32–35, respectively. In this case, the signal on track 84 is filtered by a time domain filter which includes the center channel 90 and leading channels 91, 92, . . . 93 and trailing chanels 94, 95, . . . 96. The signals from channels 90–96 are then summed on bus 38 and applied to one of the inputs on the multichannel amplifier unit 13. Similarly, three additional time domain filters are provided, one for each of tracks 81–83. The filter outputs are all summed with the signal on channel 97 from track 62.

In the case illustrated in FIGURE 4, the filter weights would be defined for each of the tracks 81–84 by the relationships existing in Equation 1 where the individual horizontal component signal would be referred to rather than a summation of several horizontal seismometer signals.

In practice, filters utilizing twenty-five filter points have been found to be satisfactory. That is, rather than employ the seven channels specifically illustrated in FIGURE 2, twenty-five such channels were employed. When twenty-five channels are employed, the autocorrelations specified $$\begin{bmatrix} \phi hh(0) & \phi hh(1) & \phi hh(2) & \ldots & \phi hh(2n) \\ \phi hh(1) & \phi hh(0) & \phi hh(1) & \ldots & \phi hh(2n-1) \\ \phi hh(2) & \phi hh(1) & \phi hh(0) & \ldots & \phi hh(2n-2) \\ \vdots & \vdots & \vdots & & \vdots \\ \phi hh(2n) & \phi hh(2n-1) & \phi hh(2n-2) & \ldots & \phi hh(0) \end{bmatrix} \begin{bmatrix} f(-n) \\ f(-n+1) \\ f(-n+2) \\ \vdots \\ f(n) \end{bmatrix} = \begin{bmatrix} \phi hv(-n) \\ \phi hv(-n+1) \\ \phi hv(-n+2) \\ \vdots \\ \phi hv(+n) \end{bmatrix} \quad (1)$$

where:

$\phi hh$ is the value of the autocorrelation function of the horizontal summation signal ($h$) for each of the delay intervals of $\tau = 0, 1, 2, \ldots 2n$;

$f$ denotes the weights of the time domain filter at points $\tau = -n, -1, 0, 1, \ldots n$; and $\phi hv$ is the value of the crosscorrelation function between the horizontal summation signal ($h$) and the vertical component signal ($v$) for each of the delay intervals $\tau = +n, \ldots +1, 0, -1, \ldots -n$.

It will be appreciated that the values of the weighting resistors in channels 65, 71–77 cannot be specified more exactly than in relative terms as set out in Equation 1.

by rectangular matrix of Equation 1 will be employed for a total of twenty-five delay intervals. Similarly, the crosscorrelations specified by the right-hand column matrix of Equation 1 will be employed for twenty-five delay intervals It will now be appreciated that arrays may include several rings of horizontal component seismometers located around a given vertical component seismometer. In such case, where the arrays are symmetrical, the outputs from all seismometers in a given ring may be combined and filtered as above described. All seismometers in each other ring similarly will be connected to summation means and the summation signal filtered and then added to the signals from (a) the vertical component seismometer, and (b) the outputs of filters for all other rings of seismometers arrayed around the given vertical component seismometer.

While surface waves generated by source 10 generally are not considered to comprise ambient noise, such waves will be treated by the filter herein and thus, for the purpose of this invention such waves are within the term ambient noise.

Having described the invention in connection with certain specific embodiments thereof, it is to be understood that further modifications may now suggest themselves to those skilled in the art and it is intended to cover such modifications as fall within the scope of the appended claims.

What is claimed is:

1. In seismic exploration, the combination which comprises:
   (a) a vertical component seismometer at a detecting station,
   (b) a plurality of horizontal component seismometers in a symmetrical array in the region of said vertical component seismometer,
   (c) means for summing the output signals from said array,
   (d) means for storing the output signal from said vertical component seismometer and said sum on a common time scale,
   (e) means for modifying said sum signal in accordance with the coupling relations between horizontal and vertical components of ambient noise in said region, and
   (f) means for subtracting said modified signal from said signal from said vertical component seismometer.

2. In seismic exploration wherein seismic waves are produced at a sending station and received at a detecting station by a vertical component seismometer, the combination which comprises:
   (a) a plurality of horizontal component seismometers arrayed about said vertical seismometer,
   (b) filter means to generate from the signals from said horizontal seismometers an interpolation error signal representative of noise components in the signal from said vertical seismometer, and
   (c) means to combine the signal from said vertical seismometer and said interpolation error signal to enhance signals representative of vertically arriving energy at said vertical seismometer.

3. The combination set forth in claim 2 wherein said horizontal component seismometers are arrayed non-symmetrically with respect to said vertical component seismometer and wherein a separate filter is provided for filtering the output of each horizontal component seismometer before combining with the signal from said vertical component seismometer.

4. The combination set forth in claim 2 wherein horizontal component seismometers are arranged symmetrically around said vertical component seismometer in rings of successively increasing diameter and wherein the seismometers located in each such ring are connected together to produce a summed output which output is filtered to produce an interpolation error signal representative of noise components in the signals from said vertical seismometer and wherein the outputs from a plurality of such interpolation error signals are combined with the signal from said vertical component seismometer.

5. A seismic exploration system for enhancing vertically travelling P-waves which comprises:
   (a) a vertical component seismometer located at a detecting location,
   (b) means for registering the output of said seismometer as a time varying function,
   (c) a horizontal component seismometer located in the vicinity of said vertical component seismometer, and
   (d) a filter for applying the output of said horizontal component seismometer to the output of said vertical component seismometer where said filter is a time domain filter representative of the coupling between horizontal and vertical components of ambient noise detected by said seismometers.

6. The method of enhancing vertically travelling P-waves in seismic exploration which comprises:
   (a) at a detecting station simultaneously generating a first signal representative of vertical components of motion at said station and at least one second signal representative of horizontal components of motion at said station,
   (b) filtering said second signal in accordance with the coupling relation between horizontal and vertical components of ambient noise at said detecting station, combining the filtered second signal and the first signal, and
   (c) registering the combined signals as a time varying function.

7. The method according to claim 6 wherein a plurality of second signals, representative of horizontal components of motion at said station, are representative of such motion at a plurality of stations symmetrically located relative to and spaced from the point of detection of said vertical component of motion and wherein said second signals are summed prior to filtering.

8. The method according to claim 7 wherein a plurality of sets of second signals, representative of horizontal components of motion, are representative of motion at points symmetrically located on rings of increasing diameter relative to the point of detection of said vertical components and wherein second signals detected at all points in each said ring are separately summed and the summation signals are separately filtered before being combined with said first signal.

References Cited
UNITED STATES PATENTS

| | | | |
|---|---|---|---|
| 2,216,452 | 10/1940 | Owen | 181—.5 |
| 3,003,577 | 10/1961 | Itria | 181—.5 |
| 3,032,164 | 1/1967 | Waters et al. | 181—.5 |

SAMUEL FEINBERG, *Primary Examiner.*